United States Patent Office 3,257,772
Patented June 28, 1966

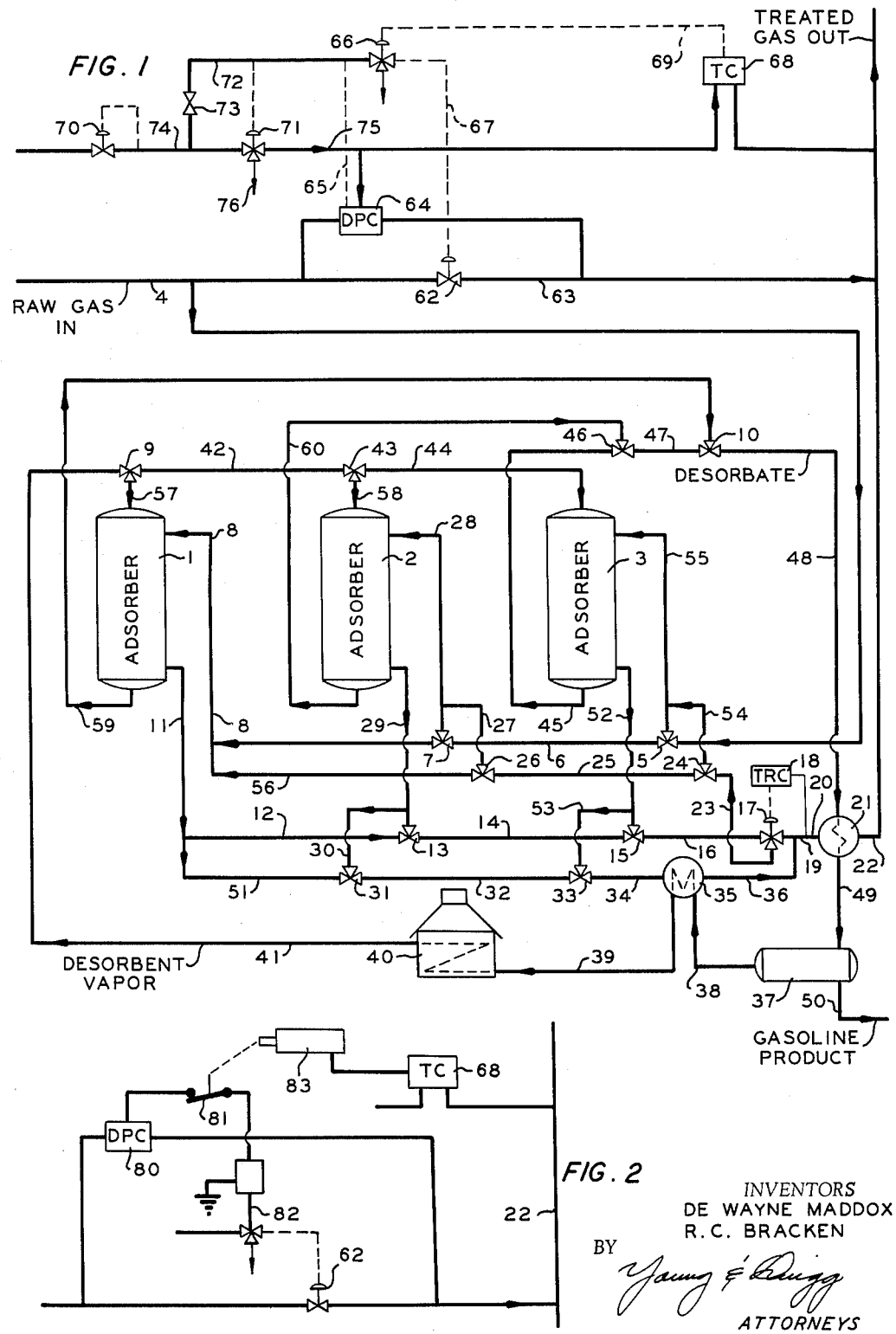

3,257,772
FLOW CONTROL METHOD AND APPARATUS FOR ADSORPTION
De Wayne Maddox and Robert C. Bracken, Bartlesville, Okla., assignors to Phillips Petroleum Company, a corporation of Delaware
Filed May 23, 1963, Ser. No. 282,643
10 Claims. (Cl. 55—20)

This invention relates to flow control. In one aspect the invention relates to apparatus and method for controlling flow through an absorber. In another aspect the invention relates to apparatus and method for actuating a device. In another aspect the invention relates to apparatus and method for actuating a valve. In another aspect the invention relates to apparatus and method for processing natural gas.

Adsorption gasoline plants are often used to remove natural gasoline from natural gas which has only a small concentration of gasoline. In most such instances the gas is at a high pressure and is passed to a pipeline. In the operation of such a pipeline it is undesirable either to cut the rate of supply of gas or to have the gas temperature higher than normal after the gas has passed through the adsorber.

An object of the invention is to control fluid flow.

Another object of the invention is to control the flow of natural gas through an adsorber system, to prevent interruption of the gas stream from the adsorber and to prevent undesirably high temperatures in this stream.

Another object of the invention is to control flow through an adsorber.

Another object of the invention is to process natural gas.

Another object of the invention is to actuate a valve.

Other aspects, objects, and the advantages of the invention are apparent in the written description, the drawing and the claims.

According to the invention, flow through an adsorber is controlled by continuously producing a first control signal representative of the pressure drop through the adsorber, and opening a by-pass around the adsorber when the pressure drop exceeds a predetermined value, and continuously producing a second control signal representative of the temperature of a product stream from the adsorber and opening a by-pass around the adsorber when the temperature reaches a predetermined value. Further according to the invention, flow through an adsorber is controlled by continuously measuring the pressure drop through the adsorber and producing a first control signal representing the pressure drop, transmitting the first signal to actuating means for a by-pass valve for the adsorber to maintain the valve closed when the pressure drop is in a normal range, reducing the first signal to permit the valve to open when the pressure drop exceeds a predetermined value, continuously measuring the product outlet temperature from the adsorber and producing a second control signal representing the temperature, changing the second signal and preventing transmission of the first signal responsive to the change in the second signal when the temperature exceeds a predetermined value, thus permitting the valve to open independently of the first signal. The first signal can be a pressure signal in which case it is transmitted through a pipe to actuating means for the valve and the second signal lowers the pressure in the pipe independently of the first signal, or the first signal can be an electrical signal in which instance the second signal prevents transmission of the first signal by disabling the conductor for the first signal.

Further according to the invention, a device such as a valve is actuated by continuously producing a first control signal representative of a first variable, continuously producing a second signal representative of a second variable, transmitting the first signal to maintain the device in a first position when the first variable is in an operating range, reducing the first signal to permit the device to assume a second position when the first variable moves outside the operating range, and transmitting the second signal to interrupt transmission of the first signal responsive to change in the second variable.

Further according to the invention, natural gas is processed by passing the gas through an adsorber, and controlling a by-pass around the absorber to open the by-pass when the pressure drop across the adsorber or the outlet temperature exceed predetermined values.

In the drawing:
FIGURE 1 is a schematic diagram of a natural gas processing system.
FIGURE 2 is a schematic diagram of a portion of a natural gas processing system.

In FIGURE 1 there are provided three adsorbers 1, 2 and 3, which are operated in a cycle so that at all times one adsorber is on stream removing liquids from the raw gas, a second is being regenerated by passing it through a hot gas which removes the previously-adsorbed liquid, and the third is being cooled subsequent to regeneration with hot gas and prior to being placed back on stream. In the following description, adsorber 1 is on stream, adsorber 2 is being regenerated, and adsorber 3 is being cooled. Raw gas containing liquid or vapor to be adsorbed is introduced into the system through conduit 4. Three-way valve 5 is positioned to pass the gas to conduit 6, and three-way valve 7 is positioned to pass the gas to conduit 8. The gas thus is being passed through adsorber 1 for treatment. Valves 9 and 10 are positioned so that the treated gas leaves adsorber 1 by way of conduit 11, through conduit 12, valve 13, conduit 14, and valve 15 to conduit 16. Valve 17 is actuated in response to a temperature signal from controller 18 so that it passes only a portion of the gas from conduit 16 to conduits 19 and 20. This portion of the gas is then passed through heat exchanger 21 and conduit 22 and supplied as a dry gas product of the desired maximum temperature for transmission to the pipeline. Controller 18 measures the temperature of the gas in conduit 20 and actuates valve 17 to maintain the temperature below a predetermined maximum. This is accomplished by cooling the gas being used for adsorbent cooling in an additional cooler as described below.

Adsorbent in adsorber 3 having been heated by regeneration during the previous portion of the cycle is now cool. The portion of treated gas from conduit 16 which is not passed by valve 17 to conduit 19 is sent to conduit 23 and valve 24. Valve 24 is positioned to pass the gas to conduit 54, through conduit 55 and adsorber 3 through conduits 52 and 53, valve 33 and conduit 34 to cooler 35. The cooled gas passes through conduit 36 to conduit 20 where it is admixed with gas from conduit 19. Because adsorber 3 is very hot immediately after regeneration, the rate of cooling gas passed through it is relatively small at this time, so that its large rise in temperature while passing through adsorber 3 does not raise the temperature of the mixture in conduit 20 above the desired maximum. As the adsorbent cools, the rate of cooling gas is increased. This is controlled by controller 18 which actuates valve 17 to divert an ever-increasing portion of the gas from conduit 16 into conduit 23 for cooling purposes without, however, exceeding the desired maximum temperature in conduit 20. As the cooling cycle progresses, valve 17 gradually is moved so as to pass all the gas from conduit 16 into conduit 23, and none in conduit 19. Thus it is seen that the adsorbent in adsorber 3 is cooled at the highest possible ratee without exceeding the desired temperature of effluent gas.

A portion of the desorbed uncondensed vapor is used for desorption. Gasoline vapor from product tank 37 is passed through conduit 38 to heat exchanger 35 wherein the vapor is heated while cooling the gas in conduit 34 as previously described. The warmed vapor then is passed through conduit 39 to a furnace 40, wherein the vapor is superheated. The superheated vapor passes through conduit 41, valve 9, conduit 42, valve 43 and conduit 58 to adsorber 2 where it serves to desorb the liquid adsorbed in a previous cycle. The desorbent and desorbate are then passed through conduit 60, valve 10 and conduit 48 to heat exchanger 21, previously described, wherein the fluids are condensed. The liquid then flows through conduit 49 to product tank 37. Product gasoline, that is the excess over the amount in circuit for regeneration, is withdrawn through conduit 50 for further use.

The adsorbers 1, 2 and 3 pass through the portions of the cycles, adsorption, regeneration and cooling, as noted above. Regeneration preferably is terminated and the operations switched when the effluent temperature of the adsorber being regenerated reaches a predetermined value. The following table shows the position of all the valves through a complete cycle of the system.

TABLE I.—ADSORBER OPERATION

| Valve Number | 1 on adsorbing 2 on regeneration 3 on cooling | 1 on regeneration 2 on cooling 3 on adsorbing | 1 on cooling 2 on adsorbing 3 on regeneration |
|---|---|---|---|
| | Conduits Connected by Valve | | |
| 5 | 4-6 | 4-55 | 4-6 |
| 7 | 6-8 | 6-8 | 6-28 |
| 9 | 41-42 | 41-57 | 41-42 |
| 10 | 47-48 | 59-48 | 47-48 |
| 13 | 12-14 | 12-14 | 29-14 |
| 15 | 14-16 | 52-16 | 14-16 |
| 24 | 23-54 | 23-25 | 23-25 |
| 26 | 25-27 | 25-27 | 25-56 |
| 31 | 30-32 | 30-32 | 51-32 |
| 33 | 53-34 | 32-34 | 32-34 |
| 43 | 42-58 | 42-44 | 42-44 |
| 46 | 60-47 | 45-47 | 45-47 |

NOTE.—Valve 17 is, during all cycles, splitting stream 16 between conduits 19 and 23 as described.

As will be understood, miscellaneous equipment such as pumps and additional heat exchangers can be provided.

Switching of the valves 5, 7, 9, 10, 13, 15, 24, 26, 31, 33, 43 and 46 can be accomplished by any method and means known to the art. A presently preferred method and means of switching these valves is disclosed and claimed in copending application Serial No. 194,572, filed May 14, 1962 by L. G. Kitchen.

To prevent delivery of gas having an undesirably high temperature and to prevent interruption of the gas flow to the pipeline, valve 62 is provided in a by-pass line 63 connecting inlet conduit 4 and outlet conduit 22. Differential pressure controller 64 senses the differential pressure between inlet conduit 4 and outlet conduit 22 and transmits a control signal through conduit 65, valve 66 and conduit 67 to the diaphragm motor of valve 62, the signal decreasing with increasing differential pressure. Valve 62 closes upon a reduction of pressure. Temperature controller 68 senses the temperature in outlet conduit 22 and transmits a control signal through conduit 69 to the motor of valve 66. When the temperature increases above a desired minimum, valve 66 is switched to vent line 67 and close off conduit 65, thus permitting valve 62 to close independently of the pressure supply from controller 64.

Instrument air is supplied to controllers 64 and 68 through a regulator 70 and a three-way valve 71. The diaphragm of valve 71 is connected with the output conduit 65 of controller 64 and with a by-pass conduit 72 controlled by a valve 73. Valve 73 is closed in normal operation. With pressure supplied to the diaphragm of valve 71, this valve connects instrument air inlet conduit 74 with instrument air supply conduit 75 while, with pressure removed from the diaphragm, conduit 74 is closed and conduit 75 is connected with a vent conduit 76. When the differential pressure increases above a desired value, differential pressure controller 64 transmits a signal through conduit 65, valve 66 and conduit 67 which is smaller than normal, thus permitting valve 62 to close. The reduction in pressure in conduit 65 also permits valve 71 to close conduit 74 and vent conduit 75, thus removing all instrument air from the system. This prevents valve 62 from reopening when the differential pressure across it is reduced. To start the system in operation, valve 73 must be open to supply pressure to the diaphragm of valve 71 to permit conduits 74 and 75 to supply air to the control instruments.

It will be recognized that actuation energy other than air under pressure can be used for the various control functions of this invention. For example, a hydraulic system using a pressure liquid rather than a pressure gas can be used, or electrical systems involving direct electrical actuation of valves, solenoid valve actuations of air supply to pneumatic valves, etc. can be employed.

In the system of FIGURE 2, a differential pressure controller 80 supplies an output voltage to electrical conductor 81 which decreases as the differential pressure increases. When the voltage falls below a predtermined value, solenoid valve 82 is actuated to close the supply of air and vent the line to valve 62, thus removing the supply of pressure to the diaphragm of valve 62, permitting this valve to open. Temperature controller 68 actuates a pneumatic cylinder 83 which opens a switch 84, thus disabling conductor 81 when the temperature in outlet conduit 22 is too high.

*Example*

A plant for the removal of gasoline and water from natural gas is constructed as shown in the drawing, FIGURE 1. The three adsorbers are 6 feet in diameter by 15 feet high and have a fill of 14 feet. The upper 7 feet of fill is silica gel and the lower 7 feet is activated carbon. The silica gel is efficacious for removal of both gasoline and water from the natural gas, while the activated carbon removes primarily only gasoline. The ratio of fill of these components thus is a function of the concentration of water in the feed. The plant processes 75,000,000 standard cubic feet of natural gas per day, and produces as desorbate a net of 6,600 gallons per day of deethanized gasoline. The feed and production compositions are shown below.

TABLE II

| | $CO_2$ | $C_1$ and $C_2$ | $C_3$ | $iC_4$ | $nC_4$ | $iC_5$ | $nC_5$ | $C_6+$ |
|---|---|---|---|---|---|---|---|---|
| Feed, mol percent | 28.20 | 71.19 | .26 | .05 | .09 | .04 | .04 | .13 |
| Production, gallons percent | | | 3.10 | 2.10 | 5.45 | 6.65 | 12.40 | 70.30 |

Regeneration of the adsorber yields about 300–350 gallons liquid hydrocarbon per cycle. About 35–40 minutes are required to regenerate an adsorber. About 9–10 million cubic feet per day of 400–425° F. vapor is used for regeneration, which takes place at about 1,000 p.s.i.g. The feed is saturated with water ambient temperature and the treated gas contains less than 7 pounds of water per million cubic feet of gas.

The effluent gas in conduit 22 normally has a temperature in the range of 100–120° F. and the differential pressure between conduit 4 and conduit 22 is less than 50 p.s.i.g. Controller 64 is set to open valve 62 when the differential pressure between the entrance to the adsorber and the discharge from the adsorber, that is between lines 4 and 22, becomes greater than 50 p.s.i.g., and controller 68 is adjusted to operate valve 66 to permit valve 62 to open independently of the action of controller 64, when the temperature in conduit 22 becomes greater than 200° F.

Reasonable variation and modification are possible within the scope of our invention which sets forth method and apparatus for controlling a valve, controlling flow through an adsorber, and processing natural gas.

We claim:

1. A method for controlling flow through an adsorber, which comprises the steps of:
   continuously measuring the pressure drop through said adsorber and producing a first control signal representing said pressure drop;
   transmitting said first signal to actuating means for a by-pass valve for said adsorber to maintain said valve closed when said pressure drop is in a normal range;
   reducing said first signal to permit said valve to open when said pressure drop exceeds a predetermined value;
   continuously measuring the product outlet temperature from said adsorber and producing a second control signal representing said temperature; and
   changing said second signal and, responsive to said change, preventing transmission of said first signal when said temperature exceeds a predetermined value, thus permitting said valve to open independently of said first signal.

2. A method for controlling flow through an adsorber, which comprises the steps of:
   continuously measuring the pressure drop through said adsorber and producing a first control pressure signal representing said pressure drop;
   continuously measuring the product outlet temperature from said adsorber and producing a second control signal representing said temperature;
   transmitting said first signal through a pipe to actuating means for a by-pass valve for said adsorber, to maintain said valve closed when said pressure drop is in a normal range;
   reducing said first signal to permit said valve to open said by-pass valve when said pressure drop exceeds a predetermined value; and
   when said temperature exceeds a predetermined value, changing said second signal and, responsive to said change, lowering the pressure in said pipe to prevent transmission of said first signal to said actuating means for said valve, thus permitting said valve to open independently of said first signal.

3. A method for controlling flow through an adsorber, which comprises the steps of:
   continuously measuring the pressure drop through said adsorber and producing a first electrical control signal representing said pressure drop;
   continuously measuring the product outlet temperature from said adsorber and producing a second control signal representing said temperature;
   transmitting said first signal through an electrical conductor to actuating means for a by-pass valve for said adsorber, to maintain said valve closed when said pressure drop is in a normal range;
   reducing said first signal to permit said valve to open said by-pass valve when said pressure drop exceeds a predetermined value; and
   when said temperature exceeds a predetermined value, changing said second signal and, responsive to said change, disabling said conductor for transmission of said first signal to said actuating means for said valve, thus permitting said valve to open independently of said first signal.

4. A method for controlling flow through an adsorber, which comprises the steps of:
   continuously measuring the pressure drop through said adsorber and opening a by-pass around said adsorber when said pressure drop exceeds a predetermined value; and
   continuously measuring the temperature of a product stream from said adsorber and opening a by-pass around said adsorber when said temperature exceeds a predetermined value.

5. A method for processing natural gas, which comprises the steps of:
   passing said gas through an adsorber prior to delivery of said gas;
   continuously producing a first control signal representative of the pressure drop through said adsorber and opening a by-pass around said adsorber when said pressure drop exceeds a predetermined value; and
   continuously producing a second control signal representative of the temperature of a product stream from said adsorber and opening a by-pass around said adsorber when said temperature exceeds a predetermined value.

6. Apparatus for controlling flow through an adsorber, comprising:
   an adsorber;
   an inlet line to said adsorber;
   an outlet line from said adsorber;
   a by-pass conduit connecting said inlet conduit and said outlet conduit;
   a valve in said by-pass conduit;
   a motor to actuate said valve;
   means to produce a first signal representative of the pressure drop across said valve;
   means to transmit said first signal to the motor of said valve to maintain said valve closed when said pressure drop is in a normal range;
   means to produce a second control signal representing the temperature in said outlet conduit; and
   means to disable said means to transmit said first signal responsive to change in said second signal to prevent transmission of said first signal when said temperature exceeds a predetermined value, thus permitting said valve to open independently of said first signal.

7. Apparatus for controlling flow through an adsorber, comprising:
   an adsorber;
   an inlet conduit to said adsorber;
   an outlet conduit from said adsorber;
   a by-pass conduit connecting said inlet conduit and said outlet conduit;
   a valve in said by-pass conduit;
   a motor to operate said valve;
   means to produce a pressure control signal representing the pressure drop from said inlet conduit to said outlet conduit;
   a pipe to transmit said pressure signal to said motor;
   means to produce a second control signal representing the temperature in said outlet conduit; and
   means to lower the pressure in said pipe responsive to said second signal when said temperature exceeds a predetermined value to prevent transmission of said first signal to said motor, thus permitting said valve to open independently of said first signal.

8. Apparatus for controlling flow through an adsorber, comprising:
an adsorber;
an inlet conduit to said adsorber;
an outlet conduit from said adsorber;
a by-pass conduit connecting said inlet conduit and said outlet conduit;
a valve in said by-pass conduit;
a motor on said valve;
means to produce an electrical control signal representative of the pressure drop between said first conduit and said second conduit;
an electrical conductor to transmit said electrical signal to actuate said valve motor to maintain said valve closed when said pressure drop is in a normal range;
means to produce a second control signal representing the temperature in said outlet conduit; and
means to disable said conductor to prevent transmission of said first signal thus permitting said valve to open independently of said first signal when said temperature exceeds a predetermined value.

9. Means for controlling flow through an adsorber, comprising:
an adsorber;
means to produce a first signal representing the pressure drop through said adsorber;
means to open a by-pass around said adsorber responsive to said first signal when said pressure drop exceeds a predetermined value;
means to produce a second control signal representing the outlet temperature from said adsorber; and
means to open a by-pass around said adsorber when said temperature exceeds a predetermined value.

10. Apparatus for processing natural gas, comprising:
an adsorber;
means to produce a first control signal representative of the pressure drop through said adsorber;
a by-pass around said adsorber;
means to open said by-pass responsive to said first signal when said pressure drop exceeds a predetermined value;
means to produce a second control signal representative of the output temperature from said adsorber; and
means to interrupt transmission of said first signal responsive to change in said second signal.

References Cited by the Examiner

UNITED STATES PATENTS

| | | | |
|---|---|---|---|
| 2,395,357 | 2/1946 | Trawick | 55—217 |
| 2,698,717 | 1/1955 | Sisco | 251—29 X |
| 2,957,544 | 10/1960 | Baker | 55—162 |
| 2,974,100 | 3/1961 | Mitchell | 196—132 |
| 2,995,203 | 8/1961 | Maurer | 55—21 |
| 3,066,175 | 11/1962 | Bauer et al. | 196—132 |
| 3,080,692 | 3/1963 | Staley et al. | 55—18 |
| 3,136,333 | 6/1964 | Griswold | 251—29 X |

REUBEN FRIEDMAN, *Primary Examiner.*

J. ADEE, B. NOZICK, *Assistant Examiners.*